United States Patent Office 3,062,004
Patented Nov. 6, 1962

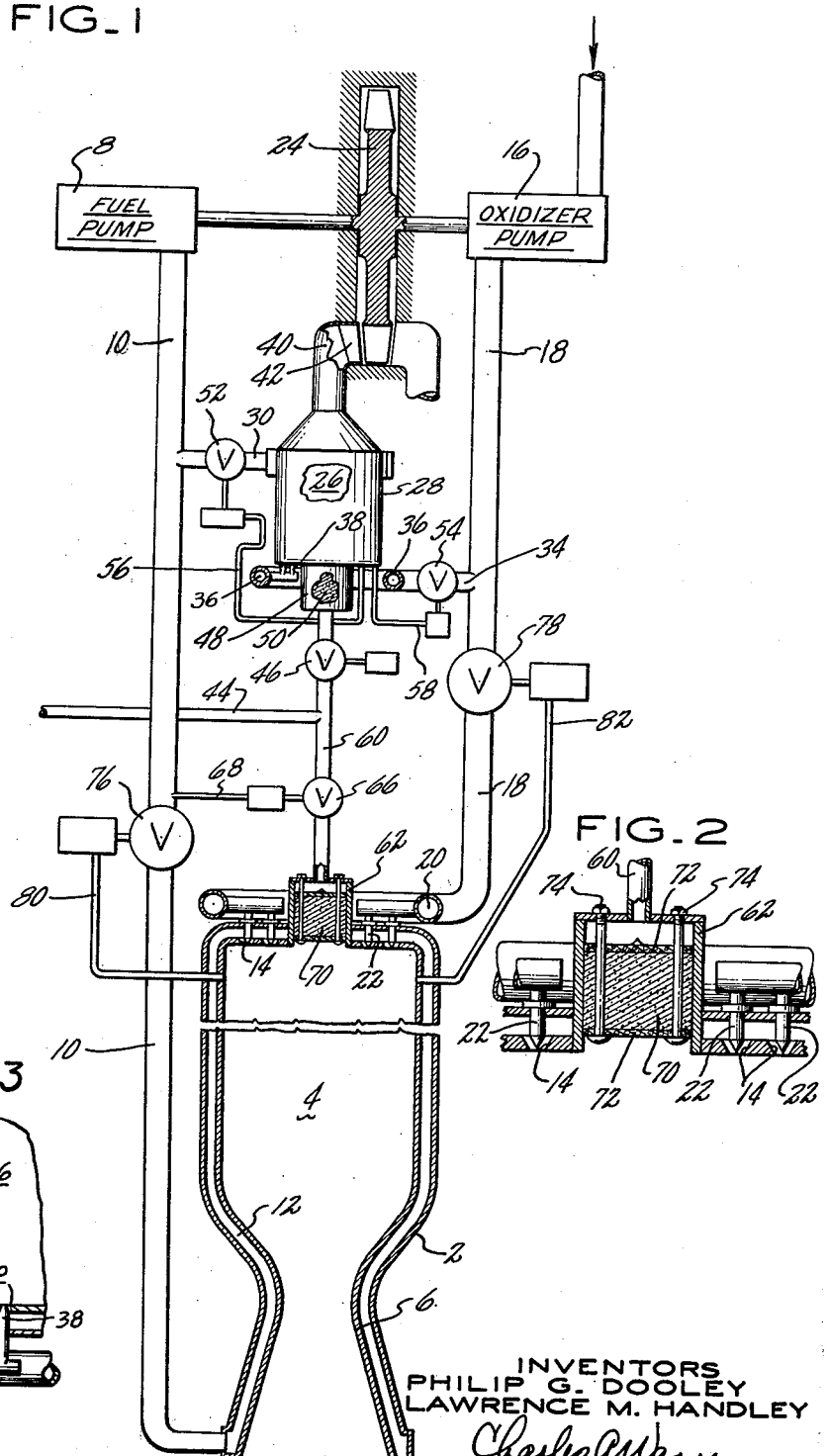
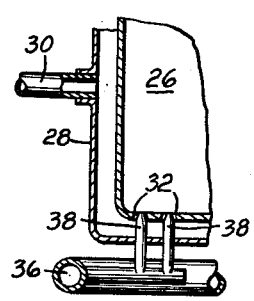
FIG.1
FIG.2
FIG.3
INVENTORS
PHILIP G. DOOLEY
LAWRENCE M. HANDLEY
BY Charles A. Warren
ATTORNEY

3,062,004
ROCKET MOTOR STARTER
Philip G. Dooley, Manchester, and Lawrence M. Handley, Storrs, Conn., assignors to United Aircraft Corporation, East Hartford, Conn., a corporation of Delaware
Filed May 18, 1959, Ser. No. 813,804
7 Claims. (Cl. 60—35.6)

This invention relates to a starter for a rocket and particularly to an arrangement for assuring a delivery of the propellant to the rocket combustion chamber and for igniting the propellants within the chamber.

One feature of the invention is a starter mechanism which will drive the pump or pumps for the propellants and will also function to ignite the propellant or propellants within the combustion chamber. Another feature is a starter system that maintains a continual supply of power gas for driving the propellant pump or pumps until the main combustion system is functioning normally.

One feature of the invention is a system which includes a gas turbine by which the propellant pump or pumps are driven and a source of gas for the turbine which is independent of the main rocket chamber. Another feature is an arrangement for supplying a monopropellant over or through a catalyst associated with the combustion chamber thereby providing a source of hot gas for igniting the main propellant within the chamber.

Other features and advantages will be apparent from the specification and claims, and from the accompanying drawing which illustrates an embodiment of the invention.

FIG. 1 is a diagrammatic view of a rocket and the associated starter system.

FIG. 2 is a sectional view on a larger scale of a portion of the starter mechanism.

FIG. 3 is a detailed view of a portion of FIG. 1.

In the arrangement shown, the main rocket 2 has the combustion chamber 4 and thrust nozzle 6. One propellant is supplied by a pump 8 through a pipe 10 to the space 12 provided by the double thickness wall of the nozzle and combustion chamber. This propellant is then discharged through nozzles 14 into the main combustion chamber 4. The other propellant or oxidizer is supplied by a pump 16 through a supply line 18 to a manifold 20. From this manifold the propellant is discharged through nozzles 22 which are preferably concentric with and, in the arrangement shown, are located within the nozzle openings 14.

The pumps 8 and 16 are driven by a gas turbine 24. Power gas for driving the turbine is supplied from an auxiliary combustion chamber 26. Propellant from the pump 8 is delivered through branch duct 30 to auxiliary chamber 26 and may be preheated by chamber wall 28 in the same manner that fuel is fed to main combustion chamber 4 as explained infra. The other propellant or oxidant from the pump 16 is supplied by a branch line 34 to the manifold 36 and thence through nozzles 38 to the auxiliary chamber. A conduit 40 connects the discharge of this chamber to the nozzle vanes 42 for the turbine.

In starting the rocket system a supply of a monopropellant such as hydrogen peroxide ($H_2O_2$) from a supply line 44 is delivered through a control valve 46 to a starting chamber 48 which communicates with the auxiliary chamber 26. The starting chamber 48 is preferably located centrally of the propellant nozzles 32 and 38, as shown, and has therein a suitable catalyst 50 which causes rapid decomposition of the monopropellant into hot gases that are discharged into the auxiliary chamber 26 and thence through the duct 40 to drive the turbine 24. When the turbine is set in operation the pumps 8 and 16 supply the main propellants to the conduits 10 and 18 and also to the branch conduits 30 and 34, respectively.

The branch conduit 30 has a pressure responsive valve 52 therein and the branch conduit 34 has a pressure responsive valve 54 therein, the valves being connected respectively to the chamber 26 by the pressure transfer ducts 56 and 58. Thus, as the pump builds up pressures in the supply conduits 30 and 34 and as the monopropellant from the starting chamber 48 builds up a pressure within the chamber 26 the valves 52 and 54 are opened for a discharge of the main propellants into the chamber 26. The heat of the products of decomposition of the monopropellant is adequate to cause ignition of the main propellants within the chamber thereby assuring an adequate supply of gas under pressure for maintaining the operation of the pump driving turbine 24.

A branch conduit 60 from the main conduit 44 for the monopropellant leads to a starting chamber 62 mounted centrally of the end of the main rocket combustion chamber 4 being located within the ring of nozzles 14 and 22 through which the main propellants are delivered to the combustion chamber. A pressure responsive valve 66 in the conduit 60 is adapted to be opened when fuel pressure in the supply conduit 10 reaches a predetermined value. This pressure is transmitted through a pressure line 68 extending from conduit 10 and communicating with the valve 66. When the valve 66 is opened the monopropellant is discharged into the starting chamber 62 which, as best shown in FIG. 2, has a catalyst bed 70 therein held in position between perforate plates 72 which in turn are positioned within the chamber 62 as by bolts 74.

The monopropellant passing through the catalyst bed 70 is decomposed into hot gases thereby producing within the main chamber 4 a pressure high enough to actuate a pressure responsive valve 76 in the supply conduit 10 and a similar valve 78 in the supply conduit 18. These pressure actuated valves are in communication with the combustion chamber 4 by pressure lines 80 and 82, respectively. With the valves 76 and 78 open the main propellants are delivered to the combustion chamber 4 and are then ignited by the hot products of decomposition of the monopropellant. When combustion of the main propellants in the chamber 4 is established the system will have reached a steady state and operation will continue with combustion taking place in both chambers 4 and 26 so long as there is a suitable supply of the main propellants. The pressure of the monopropellant in the supply line 44 is set roughly equal to the steady state pressures in the chambers 4 and 26 so that there will be substantially no monopropellant flowing when the steady state conditions occur.

It will be understood that the starting chamber 48 may be of much the same construction as that of chamber 62 which is described in considerable more detail and that, while the catalyst bed 70 is shown within the starting chamber 62, the two chambers are in intercommunication and the catalyst is in effect so associated with the main combustion chamber as to be within the total volume of the main combustion chamber.

It is to be understood that the invention is not limited to the specific embodiment herein illustrated and described, but may be used in other ways without departure from its spirit as defined by the following claims.

We claim:

1. A rocket system having a starter including a combustion chamber, a source of fuel, a source of oxidizer, first conduit means for delivering said fuel and oxidizer to said combustion chamber in response to pressure in said combustion chamber, a decomposition chamber having an outlet discharging into said starter combustion chamber and an inlet for the supply of a monopropellant, and means for delivering a monopropellant to said starter decomposition chamber, and further having a main combustion chamber with a decomposition chamber having an outlet discharging thereinto, second conduit means joining said monopropellant supply to said main combustion chamber decomposition chamber, and normally closed valve means responsive to first conduit means pressure located in said second conduit means to cause monopropellant to flow to said main combustion chamber decomposition chamber.

2. A starter as in claim 1 in which the decomposition chamber has a catalyst therein for decomposition of the monopropellant.

3. A starter as in claim 1 in which the conduit means have normally closed pressure responsive valves therein.

4. A starter as in claim 1 including propellant inlets for the fuel and oxidizer arranged in an annulus at one end of the combustion chamber and in which the decomposition chamber is in the same end of the chamber and within the ring of propellant inlets.

5. In a rocket system having a fuel supply, an oxidizer supply, a fuel pump, an oxidizer pump and means for driving said pumps, a first combustion chamber, discharge means from said first combustion chamber communicating with said pump driving means, a decomposition chamber in said first combustion chamber, a monopropellant supply, means for supplying monopropellant to said decomposition chamber in the first combustion chamber, means for supplying fuel and oxidizer to said first combustion chamber, a main combustion chamber having a thrust nozzle thereon, a decomposition chamber in said main combustion chamber, means for supplying monopropellant to said decomposition chamber in the main combustion chamber in response to the discharge pressure of one of said pumps, means for supplying fuel to said main combustion chamber and means for supplying oxidizer to said main combustion chamber.

6. In a rocket system having a fuel supply, an oxidizer supply, means for pumping said supplies and means for driving said pumping means, a first combustion chamber, a decomposition chamber in said first combustion chamber having a catalyst therein, means for supplying fuel to said first combustion chamber, means for supplying oxidizer to said first combustion chamber, valve means in each of said supply means for controlling the flow of propellants therethrough in response to pressure in said first combustion chamber, discharge means from said first combustion chamber communicating with said pump driving means for the delivery of gases thereto, a main combustion chamber, a decomposition chamber in said main combustion chamber having a catalyst therein, means for supplying fuel to said main combustion chamber, means for supplying oxidizer to said main combustion chamber, valve means in each of said supply means for controlling the flow of propellants therethrough in response to pressure in said main combustion chamber, means for supplying a monopropellant to said decomposition chamber in the first combustion chamber, and means for supplying a monopropellant to said decomposition chamber in the main combustion chamber to ignite the fuel and oxidizer therein.

7. A rocket system as in claim 5 in which valve means in the monopropellant supply means to the decomposition chamber in the first combustion chamber controls the admission of monopropellant to the decomposition chamber in the first combustion chamber, and in which valve means in the monopropellant supply means to the decomposition chamber in the main combustion chamber controls the admission of monopropellant to the decomposition chamber of the main combustion chamber in response to pressure in the fuel supply means to the main combustion chamber.

References Cited in the file of this patent

UNITED STATES PATENTS

| | | |
|---|---|---|
| 1,052,588 | Janicki | Feb. 11, 1913 |
| 2,523,008 | Goddard | Sept. 19, 1950 |
| 2,763,126 | Halford et al. | Sept. 18, 1956 |
| 2,906,091 | Kretschmer | Sept. 29, 1959 |
| 2,949,007 | Aldrich et al. | Aug. 16, 1960 |
| 2,979,891 | Widell | Apr. 18, 1961 |
| 2,995,008 | Fox | Aug. 8, 1961 |

FOREIGN PATENTS

| | | |
|---|---|---|
| 702,779 | Great Britain | Jan. 20, 1954 |
| 793,689 | Great Britain | Apr. 23, 1958 |

OTHER REFERENCES

Publication: "Gas Turbines and Jet Propulsion," by P. W. Gill, 1952 (pages 3-4 to 3-12).